US009834055B2

(12) United States Patent
Joachim et al.

(10) Patent No.: US 9,834,055 B2
(45) Date of Patent: Dec. 5, 2017

(54) LOAD LEVELING AIRBAG SUSPENSION LOAD SENSORS

(71) Applicant: World Trade Distribution, Inc., Houston, TX (US)

(72) Inventors: Jeffrey Joachim, Rosharon, TX (US); Jeremy Joachim, Rosharon, TX (US); Jason Joachim, Rosharon, TX (US); Kimberly Joachim, Rosharon, TX (US)

(73) Assignee: World Trade Distribution, Inc., Houston, TX (US)

( * ) Notice: Subject to any disclaimer, the term of this patent is extended or adjusted under 35 U.S.C. 154(b) by 0 days.

(21) Appl. No.: 14/638,340

(22) Filed: Mar. 4, 2015

(65) Prior Publication Data

US 2015/0251515 A1 Sep. 10, 2015

Related U.S. Application Data

(60) Provisional application No. 61/948,237, filed on Mar. 5, 2014.

(51) Int. Cl.
*B60G 17/015* (2006.01)
*B60G 17/052* (2006.01)
*B60G 11/27* (2006.01)

(52) U.S. Cl.
CPC .......... *B60G 17/0155* (2013.01); *B60G 11/27* (2013.01); *B60G 17/0525* (2013.01); *B60G 2202/152* (2013.01); *B60G 2300/042* (2013.01); *B60G 2400/60* (2013.01); *B60G 2500/202* (2013.01); *B60G 2500/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,998,261 A * | 8/1961 | Bartlett | ................. | B60G 5/005 105/198.1 |
| 5,651,555 A * | 7/1997 | O'Reilly | ............ | B60G 17/0565 137/119.09 |
| 6,428,026 B1 * | 8/2002 | Smith | ...................... | B60G 3/14 180/21 |
| 6,921,100 B2 * | 7/2005 | Mantini | ............... | B60G 17/005 177/137 |
| 7,285,735 B1 * | 10/2007 | Elliott | ................ | B60G 17/0155 177/1 |
| 7,316,406 B2 * | 1/2008 | Kimura | ................ | B60G 17/017 280/6.157 |
| 7,841,608 B2 * | 11/2010 | Morris | ............... | B60G 17/0155 280/124.157 |

(Continued)

FOREIGN PATENT DOCUMENTS

DE WO 2011076302 A1 * 6/2011 ......... B60G 17/0155

*Primary Examiner* — Darlene P Condra
(74) *Attorney, Agent, or Firm* — Maier & Maier, PLLC (57) ABSTRACT

A device, system, and method for leveling a load may be provided. The system may utilize load sensors to monitor the weight allocation of a load in a vehicle or trailer. The system may further include air bag suspension configured to inflate or deflate based on the weight allocation. The air bag suspension may use at least one compressed air tank, actuator, and dump valve. A computer control module may receive all of the data from the load sensors, calculate the adjustments to the suspension necessary to level the load or compensate for shifts in the load.

18 Claims, 5 Drawing Sheets

(56) References Cited

U.S. PATENT DOCUMENTS

| | | | |
|---|---|---|---|
| 7,925,401 B2* | 4/2011 | Hoffman | B60G 17/0155 701/37 |
| 7,957,865 B2* | 6/2011 | Brookes | B60G 17/0155 280/124.128 |
| 8,047,551 B2* | 11/2011 | Morris | B60G 17/0525 137/625.21 |
| 9,022,404 B2* | 5/2015 | Risse | B60G 17/0155 280/124.157 |
| 9,180,747 B2* | 11/2015 | Slawson | B60G 3/01 |
| 2005/0206231 A1* | 9/2005 | Lu | B60G 17/0162 303/146 |
| 2013/0119637 A1* | 5/2013 | Risse | B60G 17/0155 280/405.1 |
| 2014/0081522 A1* | 3/2014 | Fry | B60G 17/017 701/37 |
| 2015/0105979 A1* | 4/2015 | Hilderband | B60G 17/0165 701/38 |

\* cited by examiner

LOAD LEVELING AIRBAG SUSPENSION LOAD SENSORS

PRIORITY CLAIM

This application claims priority to U.S. Provisional Application No. 61/948,237, filed Mar. 5, 2014, the contents of which are herein incorporated by reference.

BACKGROUND

Tractor trailer turnovers are common nationwide. Even with increased efforts by the federal government, such as strict rules and regulations governing the trucking industry, the high number of truck accidents, injuries and deaths does not seem to be diminishing. Many of these accidents can be attributed to the very nature of these trucks and trailers and their application. Many are driver error, but many may be caused by the cargo or load being mis-loaded or shifting inside the trailer or ocean container. When too much weight accumulates on one side, the center of gravity may shift and create a force which can overturn a vehicle.

In the case of a line haul driver or an ocean container, the driver may have nothing to do with the loading or securing of the cargo in the van or container. In fact, the container may have a seal on it when the driver gets it. This may prevent a driver from ensuring a load is properly loaded and secured. Freight weight is densely concentrated and may differ greatly between load types and sizes, which may make even distribution difficult or impossible. Uneven loads may also cause poor fuel economy and increase wear and tear on vehicle components. Improper balancing may lead to vibrations. Also, small bumps in a road may be magnified by uneven loads. The vibrations and magnified momentum from small bumps may lead to increased wear on a vehicle.

SUMMARY

According to an exemplary embodiment, a load leveling air bag suspension system is disclosed. The load leveling air bag suspension system may include a computer control module, at least one load sensor in communication with the computer control module, and at least one air tank. The air tank may have an actuator in communication with the computer control module. The system may also include at least one airbag suspension device coupled to the at least one air tank actuator by an air hose.

According to another exemplary embodiment, a method for leveling a load may be provided. The method may include providing at least one weight sensor on a load bearing chassis configured to communicate weight data. A computer control module configured to receive weight data and analyze the data may also be provided. The computer control module may determine necessary suspension adjustments in order to balance the load. At least one airbag suspension device, which can inflate or deflate, may also be provided. At least one compressed air tank may be provided and may further have an actuator in communication with the computer control module and connected to the at least one airbag suspension by an air hose. The actuator may receive and implement instructions from the computer control module. Finally, the computer control module may be allowed to analyze the sensor data and instruct the actuator to inflate or deflate the at least one airbag suspension device.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein may be described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

An exemplary embodiment of a load leveling air bag suspension system may include adjustable independent air bag suspension that may react to weight sensors placed around a van or container chassis. In at least one exemplary embodiment, sensors may be placed at the four corners of the chassis. The air bags may replace the springs on each wheel and may provide an adjustable air cushion for the weight to ride on. The system may work on tractor trailer rigs, bobtails, stake beds, and other applications as would reasonably be understood by a person having ordinary skill in the art.

Figure 1:
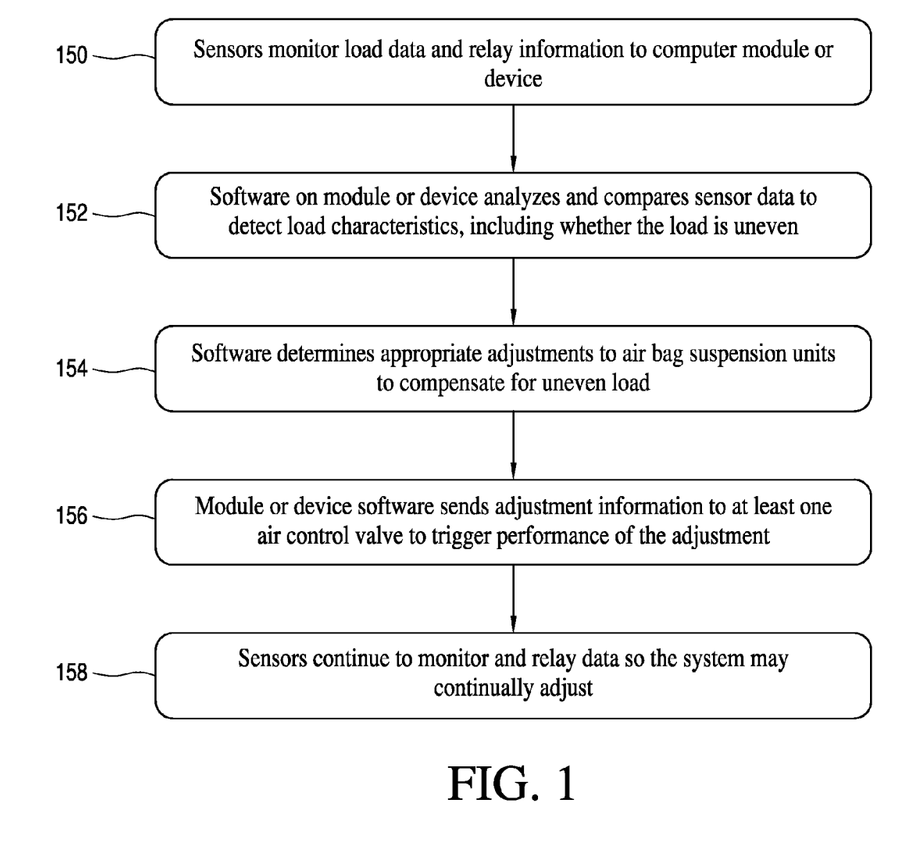
FIG. 1 is a flow diagram of an exemplary embodiment for leveling a load.

FIG. 1 shows the steps of a process for operating load leveling air bag suspension. In one embodiment, there may be four airbags on trailer tandems, one per wheel, and four airbags on the truck tandems, one per wheel. In an exemplary embodiment, there may be at least one airbag on each side of an axle. The truck may be outfitted with the trailer or chassis as one component. When a load shifts, the sensors may detect the shift and the system may immediately begin leveling the weight so it runs center weight and true. As the sensors relay information to a device or weight control console 150, software on the device or console may analyze the data to detect load characteristics, such as whether the load is uneven 152. The device or weight control console 150 may be an onboard computer, a mobile, device, or other computer device as would be understood by a person having ordinary skill in the art.

In an exemplary embodiment, the software may compare the sensor data to preset standards or historical sensor data to determine load characteristics. The software may also compare the data from one sensor with data from one or more of the other sensors. In an exemplary embodiment, there may be a control to zero the system or sensors. A baseline may be recorded and used for comparison when there is no load on the system. A baseline may also be recorded and used for comparison when a load is initially set for transportation. The software may determine appropriate adjustments based on the data 154. The software may then trigger the adjustments through an air control valve 156. In an exemplary embodiment, the air control valve may include a quad valve actuator, an electronic inflate valve, or an electronic deflate valve. The air control valve may be added to existing air tanks on a truck or trailer and may be communicatively coupled to the computer control module via hard-wiring or a wireless connection. This may allow air to flow from existing pressure tanks to fill the airbags on the weighted portion of a trailer or container chassis. Air may also be dumped from the off-weighted portion. The adjustments may provide increased driver control. The monitoring and adjustments may operate continuously 158. In other exemplary embodiments, the monitoring and adjustments may operate at periodic intervals.

The weight control console 150 may also provide weight information to an operator. The information may be provided through a display. This may assist in proper loading. Weights on axles of heavy trucks may be required to comply with certain legal limits. When loading a truck, a driver may be able to utilize the displayed information rather than traveling back and forth to a scale to gauge and balance the load properly. The air bags may be utilized to level the weight of the truck's axles, legalizing the load without requiring manipulation of the load itself. This may be accomplished by raising or lowering the axles to add or subtract weight by pressurizing or depressurizing the air bags under the axles. The built-in reporting reduces costs and time associated with properly loading a truck. It may also reduce the need for scale weighing required on certain roads or bridges and provide a monitoring resource for law enforcement personnel. For law enforcement and safety purposes, the computer calibration may be periodically tested and approved. In an exemplary scenario, a calibration sticker may be provided to prove the system passed its calibration checks. The sticker may provide confidence in the data to a law enforcement officer who plugs in to the system to check for compliance with road regulations. Additionally, the leveling or centering of a load may improve fuel efficiency and reduce wear on components of a vehicle.

The computer control module may be configured to calculate adjustments required to comply with bridge or road specific laws, including axle weights and gross weights. The system may then make the necessary axle height adjustments to comply with such laws. If the system is not able to put the load in compliance, it may alert the driver.

The system may accommodate a load that has shifted by adjusting the weight variance back to the middle. In some exemplary embodiments, it may accommodate up to a 25% weight variance and may make the calculation to adjust it back to center. In an exemplary embodiment, that would accommodate a 10,000 lb shift or variance on a 40,000 lb payload. In some embodiments, the tolerance may be adjustable to allow for road conditions. This may prevent overworking of the components, such as the air tank and compressor.

Figure 2:
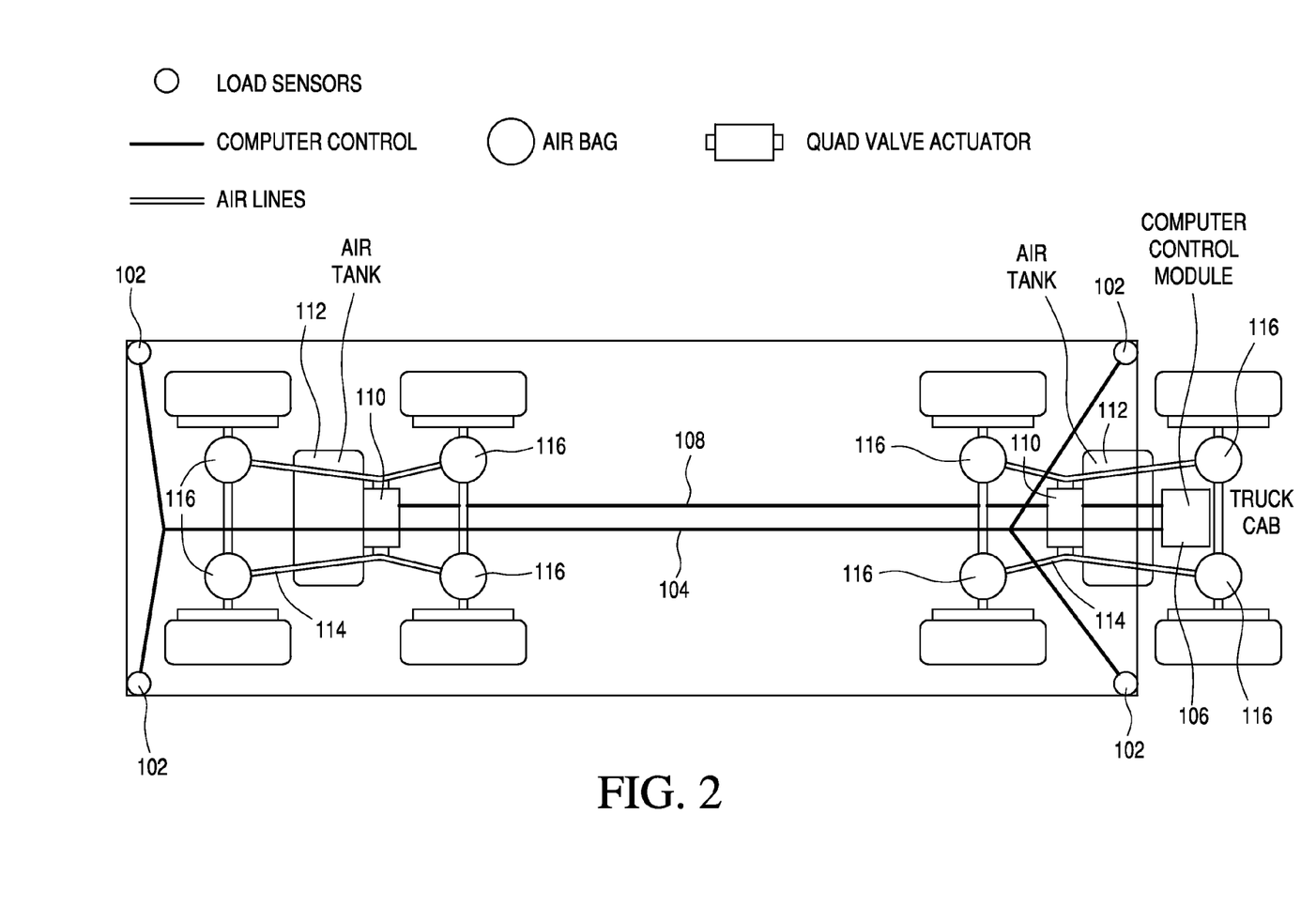
FIG. 2 is a top plan view of an exemplary embodiment of a load leveling air bag suspension system.
Figure 5:
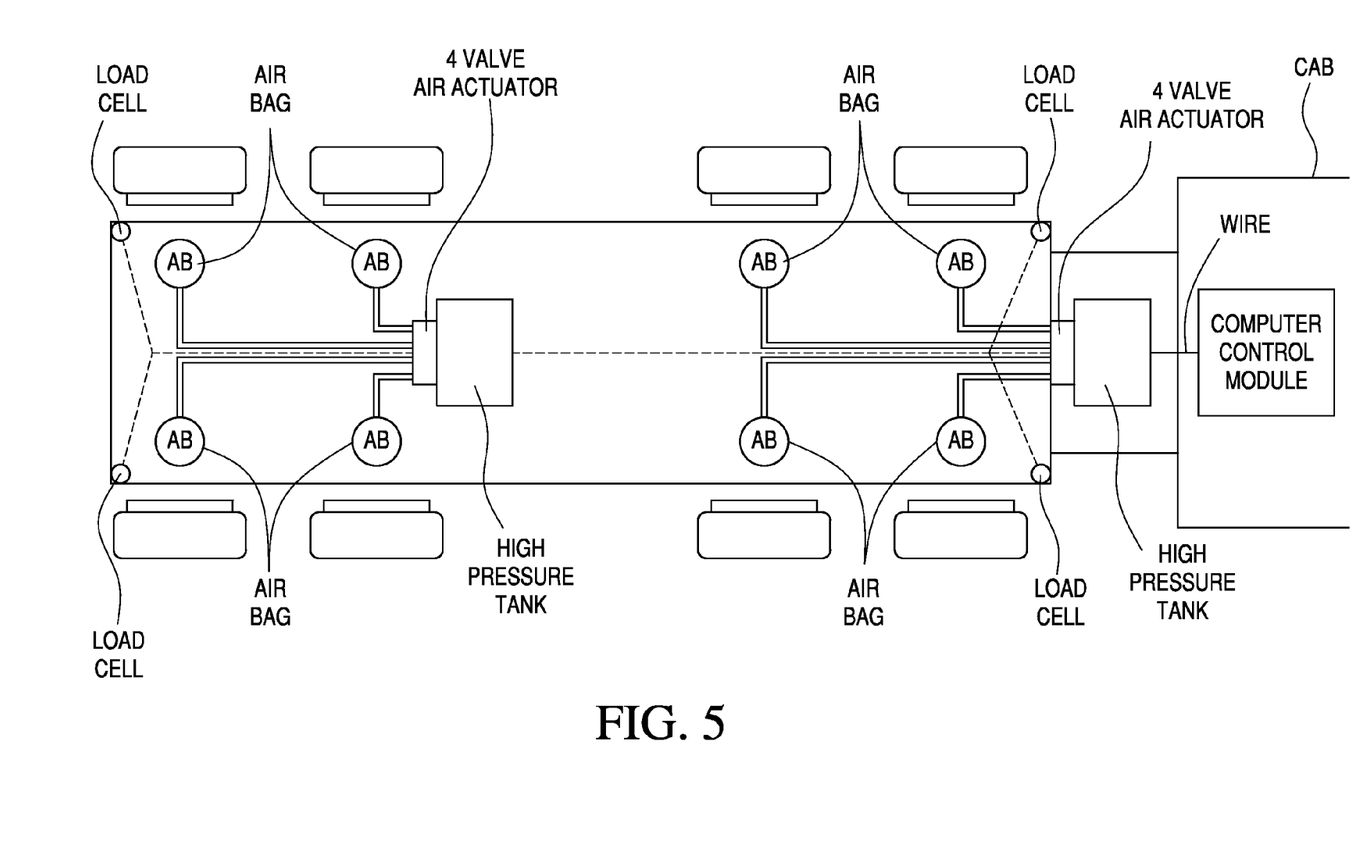
FIG. 5 is a top plan view of an alternative embodiment thereof.

FIGS. 2 and 5 show top plan views of a load leveling airbag suspension system 100 or air ride compensator. System 100 may include load sensors positioned about the base of a truck cargo area, such as a trailer. In an exemplary embodiment, the sensors may be located at the four outer corners of a trailer; however, the sensors may be located in a variety of other desired orientations. For example, the sensors may be located above an axle, around a perimeter of a truck or trailer, or anywhere within the perimeter. The sensors 102 may measure the load of the cargo. The sensors may then communicate the load data to a computer control module 106. The sensors 102 may communicate with module 106 via wires 104. In alternative exemplary embodiments, the communication may be wireless. The communication may further be over a network, such as a CAN network. The data may indicate the load dispersal in the trailer or cargo area. Computer control module 106 may analyze the load data and initiate actions based on this data.

Computer control module 106 may communicate via a computer control wire 108 with one or more actuator 110. In other exemplary embodiments, computer control module 106 may communicate wirelessly with one or more actuator 110. The communication may further be over a network, such as a CAN network. Actuator 110 may be a quad valve actuator. Actuator 110 may link a compressed air tank 112 with air bags 116 via air lines 114. Computer control module 106 may signal actuator 110 to increase the air in one or more individual air bags 116 with air from tank 112. Air bags 116 may be adjusted individually, or multiple air bags 116 may be adjusted simultaneously.

Figure 3:
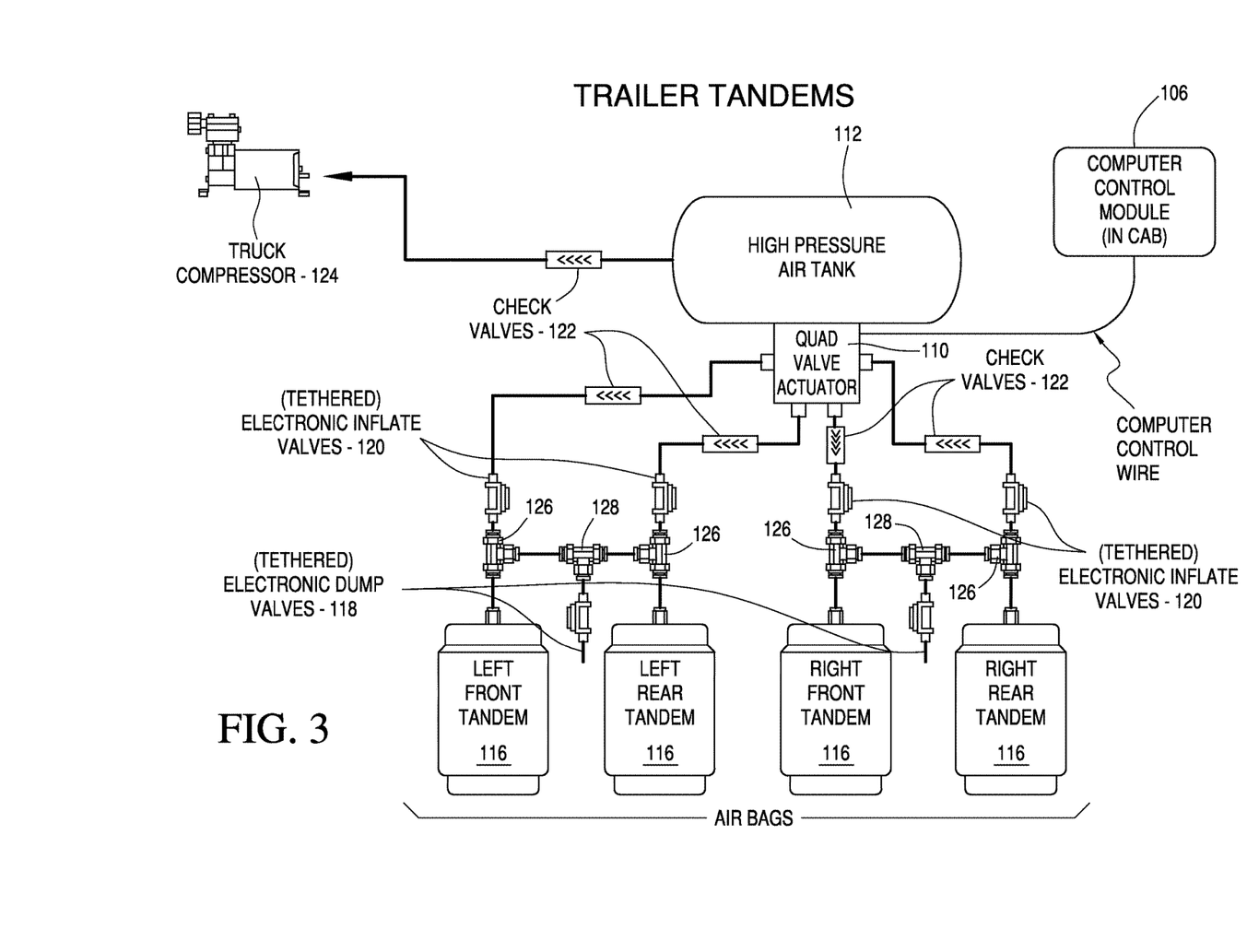
FIG. 3 is a component view of a trailer portion thereof.
Figure 4:
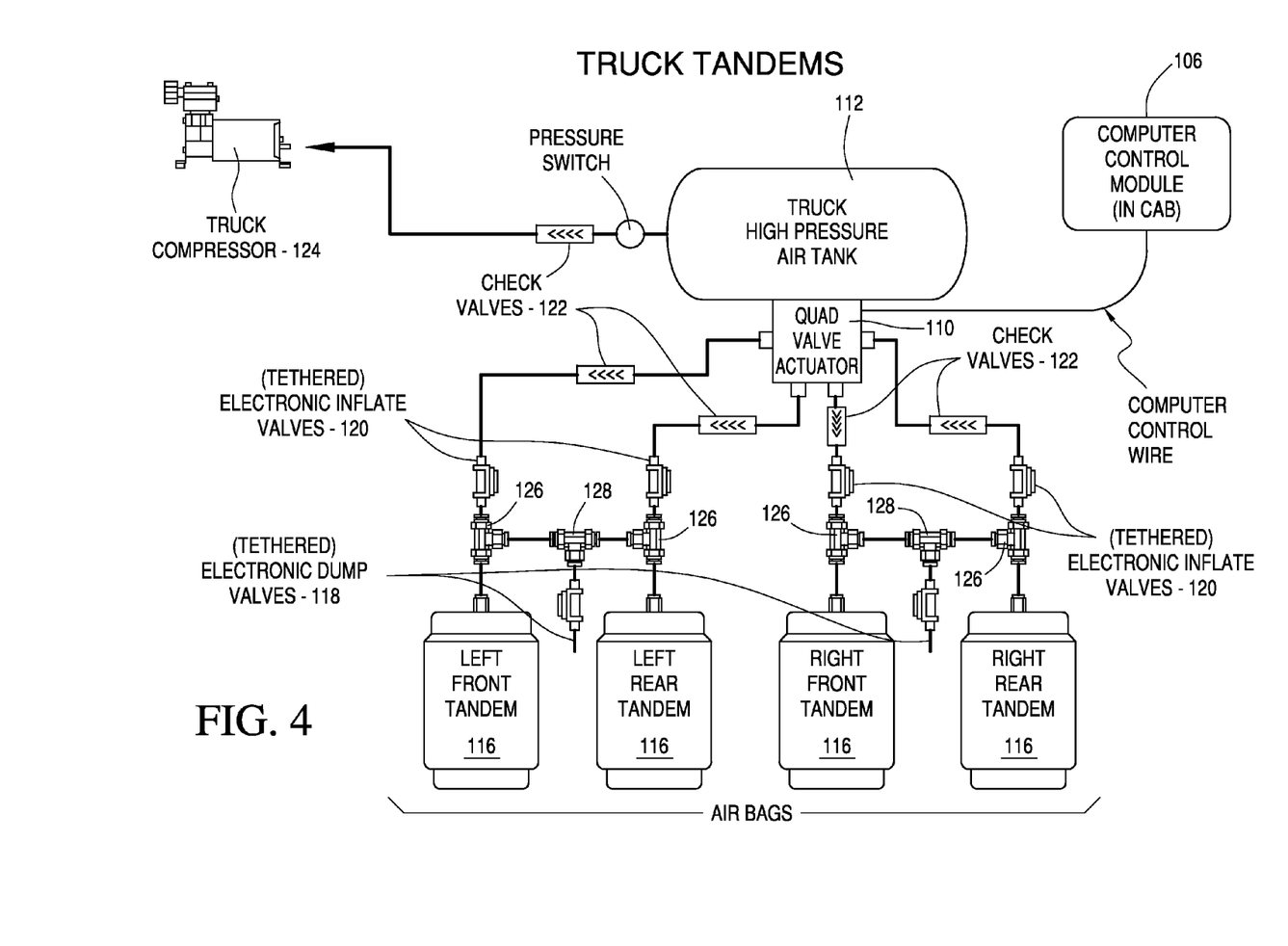
FIG. 4 is a component view of a truck portion thereof.

FIG. 3 is a component view of the trailer portion of an exemplary system 100. FIG. 4 is a component view of the truck portion of an exemplary system 100. A high pressure air tank 112 may be connected to an air compressor 124, which may fill tank 112. There may be a check valve 122 on the air line connecting compressor 124 and tank 112. In some embodiments, there may also be a pressure switch 126 between the check valve 122 and tank 112. An exemplary embodiment of the truck portion as shown in FIG. 4 may have pressure switch 126. The quad valve actuator 110 associated with tank 112 may be connected to the individual air bag suspension units 116. Each air bag 116 may be connected to a separate valve of the quad valve actuator 110, allowing for independent operation. In alternative embodiments, the number of air bags 116 may vary. Similarly, the number of tanks 112 may vary in some exemplary embodiments. For example, a trailer may have only two air bags 116. The number of air bags 116 may be associated with the number of axels, tandems, or wheels.

Still referring to FIGS. 3 and 4, check valves 122 may be located along the air lines connecting the actuator 110 to the air bags 116. There may also be electronic inflate valves along the air lines between the check valves 122 and the air bags 116. There may also be a three way split connection 126 along the air line between the inflate valve 120 and the air bag 116. The remaining port from the three way split 126 may lead to an electronic dump valve 118, which may release air. The electronic dump valve 118 may be communicatively coupled to the computer control module 106, such that the computer control module 106 can actuate the dump valve. In an exemplary embodiment, there may be one dump valve 118 for two air bags 116. This may work by tethering a three way split connection 128 along an air line connecting the three way split connections 126 of two air bags 116. The electronic dump valve 118 may be situated off the remaining port of three way split connection 128. The connections may be configured to allow the dumping of air from one of the air bags 116 or both of the air bags 116 simultaneously.

An adjustable independent air bag suspension system may operate as follows. The system may electronically analyze weight abnormalities through weight sensors. The system may react collectively and independently to compensate for weight distribution abnormalities by inflating or deflating air pressure in the air bags. The air pressure in the air bags may be inflated or deflated through one or more pressurized air tank. The one or more air tank may have one or more associated check valve and one or more associated valve actuator. The system may be used on a truck, on a trailer, on a truck and trailer combination, or other mechanical applications as may be suitable.

The following description may relate to an exemplary embodiment of the system on a truck and trailer combination. The air bags may replace the springs or other suspension on each wheel and provide an adjustable air cushion that the weight may rest and ride on. The air bags may be placed on the truck and trailer tandems. As the truck and trailer corners, leans, or moves in a manner that may un-equalize, unstable, or otherwise subject the load to force, such as centrifugal force, the weight sensors may identify a problem or shift in the load. The sensing may trigger compensation through air pressure adjustments. The air pressure may be adjusted with the aid of high pressure air tanks, actuators, and compressors located on the truck or trailer. The pressure adjustments may equalize the weight distribution of the cargo.

The weight or load sensors may electronically relay information to a load or weight control console module. The console module may include one or more dashboard indicator to alert an operator of load conditions. This feature may provide a warning to an operator before an emergency situation occurs. This may allow an operator to implement necessary safety precautions, methods, and processes to compensate for a load abnormality or other situation. In an exemplary embodiment, the dashboard indicator may include a Green light to indicate normal conditions, a Yellow light to indicate that the system has activated or initiated pressure adjustments, and a Red light to indicate a pending emergency situation. In some embodiments, there may be a heads up display on the windshield so that a driver does not have to avert their eyes from the roadway when monitoring the system or application. The heads up display may be an alternative to the dashboard display or in addition to the dashboard display. The weight control console module may also include an emergency override and indicator, which may switch the system off. When the emergency override is triggered, all air bags may be returned to a predetermined "normal" constant pressure.

In some alternative exemplary embodiments, there may be a display and graphical user interface allowing a user to view and interact with the load data. For example, a diagram of the truck may be displayed showing the load dispersion at each sensor shown on the diagram. The user may be able to input adjustments through the graphical user interface. In yet further exemplary embodiments, the system may allow for communication with a user's mobile device to support and present the data through a mobile application. The mobile application may provide a graphical user interface configured to present the system data. For example, the mobile application may provide a system diagram, similar to the in vehicle display discussed above. Further, the mobile application may allow for user input, such as zeroing the load sensors or instructing certain system functions. The computer control module may communicate with the mobile device wirelessly or through a wired connection. The system may also be configured to communicate the data in real time to a remote monitoring station, such as a trucking company headquarters.

The electronic relay of information may be in the form of a control console module within the truck/trailer unit or by utilizing other electronic devices through an application process accessible by downloading to the device. Status information and other data monitored by the system may be communicated over a network and accessed by the application. The control console module or application may maintain recorded data from the system and may provide access to such data. In some embodiments, users may view the data through a system display or the application installed on a separate device. The system may be configured to record geographic data with associated weight data. This may allow analysis of locations that may be susceptible to weight or load related incidents. For example, entities such as trucking companies, highway engineers, and State and Federal Highway Administrations may monitor, review, and research geographic locations with higher than usual incidents involving weight. This may be done through an application accessing data recorded by vehicles employing the load leveling system.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A load leveling airbag suspension system comprising:
   a computer control module;
   at least one load sensor communicatively coupled to the computer control module, the at least one load sensor configured to measure weight data of a load bearing vehicle chassis;
   at least one air tank having an actuator communicatively coupled to the computer control module;
   at least one airbag suspension device, the at least one airbag suspension device coupled to the at least one air tank actuator by an air hose;
   at least one check valve disposed along the air hose connecting the at least one actuator to the at least one airbag suspension device;
   at least one electronic inflate valve disposed along an air hose connecting the at least one check valve and the at least one airbag suspension device; and at least one multi-split connection disposed along the air hose between the at least one electronic inflate valve and the at least one airbag suspension device, the at least one multi-split connection coupled to an electronic dump valve for releasing air from the at least one airbag suspension device.

2. The load leveling airbag suspension system of claim 1 wherein the at least one load sensor and the computer control module are communicatively coupled via hard-wiring.

3. The load leveling airbag suspension system of claim 1, wherein the at least one load sensor is communicatively coupled to the computer control module wirelessly.

4. The load leveling airbag suspension system of claim 1, wherein the at least one air tank actuator is communicatively coupled to the computer control module via hard-wiring.

5. The load leveling airbag suspension system of claim 1, wherein the at least one air tank actuator is communicatively coupled to the computer control module wirelessly.

6. The load leveling airbag suspension system of claim 1, wherein the electronic dump valve is communicatively coupled to the computer control module and disposed along an air hose connected to at least one airbag suspension device, such that the electronic dump valve may deflate the at least one airbag suspension device.

7. The load leveling airbag suspension system of claim 6, further comprising a multi-way electronic valve disposed along an air tube between the electronic dump valve and the at least one airbag suspension device, such that the multi-way electronic valve may control the air tube communication between the electronic dump valve and one or more airbag suspension devices.

8. The load leveling airbag suspension system of claim 1, further comprising at least one compressor configured to fill the at least one air tank.

9. The load leveling airbag suspension system of claim 8, further comprising at least one compressor check valve disposed along an air hose connecting the at least one compressor to the at least one air tank.

10. The load leveling airbag suspension system of claim 9, further comprising a pressure switch disposed along the air hose connecting the at least one compressor check valve and the at least one air tank.

11. The load leveling airbag suspension system of claim 1, further comprising a display communicatively coupled to the computer control module and configured to indicate a load status.

12. The load leveling airbag suspension system of claim 11, wherein the display comprises a graphical user interface for displaying the load status and allowing a user to input instructions to the computer control module.

13. The load leveling airbag suspension system of claim 1, further comprising a mobile device in communication with the computer control module and configured to view a load status and provide user input to the computer control module.

14. The load leveling airbag suspension system of claim 1, wherein the at least one air tank comprises a forward air tank and a rearward air tank, each of the forward air tank and the rearward air tank having an actuator communicatively coupled to the computer control module, each of the actuators connected to at least one airbag suspension device by an air hose.

15. The load leveling airbag suspension system of claim 1, wherein at least one load sensor comprises four load sensors, and wherein each of the four load sensors is disposed proximate a corner of the load bearing vehicle chassis.

16. The load leveling airbag suspension system of claim 1 wherein the electronic dump valve is configured to release air from two airbag suspension devices.

17. The load leveling airbag suspension system of claim 1, wherein the at least one load sensor comprises a plurality of load sensors.

18. The load leveling airbag suspension system of claim 17, wherein the computer control module is configured to receive the weight data from the plurality of load sensors, compare weight data from one load sensor with weight data from at least another one of the plurality of load sensors, determine a suspension adjustment based on the compared weight data, and trigger the adjustment.

* * * * *